(12) United States Patent
Lee et al.

(10) Patent No.: US 10,341,965 B2
(45) Date of Patent: Jul. 2, 2019

(54) METHOD FOR POWER HEADROOM REPORTING AND DEVICE THEREFOR

(71) Applicant: LG ELECTRONICS INC., Seoul (KR)

(72) Inventors: Sunyoung Lee, Seoul (KR); Sungjun Park, Seoul (KR); Sunghoon Jung, Seoul (KR); Youngdae Lee, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/904,925

(22) PCT Filed: Aug. 1, 2014

(86) PCT No.: PCT/KR2014/007111
§ 371 (c)(1),
(2) Date: Jan. 13, 2016

(87) PCT Pub. No.: WO2015/020363
PCT Pub. Date: Feb. 12, 2015

(65) Prior Publication Data
US 2016/0142985 A1    May 19, 2016

Related U.S. Application Data

(60) Provisional application No. 61/862,488, filed on Aug. 5, 2013.

(51) Int. Cl.
*H04L 12/28* (2006.01)
*H04W 52/36* (2009.01)
(Continued)

(52) U.S. Cl.
CPC ......... *H04W 52/365* (2013.01); *H04W 52/34* (2013.01); *H04W 72/12* (2013.01)

(58) Field of Classification Search
CPC . H04W 52/365; H04W 52/367; H04W 52/54; H04W 72/0413; H04W 72/1284;
(Continued)

(56) References Cited

U.S. PATENT DOCUMENTS

2010/0272091 A1    10/2010  Fabien et al.
2012/0039223 A1    2/2012   Chang
(Continued)

FOREIGN PATENT DOCUMENTS

KR    10-2011-0050311 A    5/2011

OTHER PUBLICATIONS

"On remaining details for uplink power control with carrier aggregation", 3GPP TSG-RAN WG1 Meeting #60, R1-100846, San Francisco, USA, Feb. 22-26, 2010.

*Primary Examiner* — Noel R Beharry
*Assistant Examiner* — Lionel Preval
(74) *Attorney, Agent, or Firm* — Dentons US LLP

(57) ABSTRACT

A method and a device for power headroom reporting in a wireless communication system, where reporting PH involves obtaining information related to a power headroom (PH) for a second BS, obtaining PH of activated cells of the device, and transmitting, to a first BS, the information related to the PH for the second BS and the PH of activated cells of the device.

4 Claims, 14 Drawing Sheets

(51) Int. Cl.
  *H04W 52/34* (2009.01)
  *H04W 72/12* (2009.01)
(58) Field of Classification Search
  CPC ... H04W 24/10; H04W 52/146; H04W 72/02;
    H04W 72/0406; H04W 72/042; H04W
    52/34; H04W 72/12; H04L 5/0035; H04L
    5/0053
  See application file for complete search history.

(56) References Cited

U.S. PATENT DOCUMENTS

| | | | |
|---|---|---|---|
| 2012/0113848 A1 | 5/2012 | Kim et al. | |
| 2012/0113919 A1 | 5/2012 | Kone | |
| 2012/0218904 A1* | 8/2012 | Narasimha | H04L 5/001 370/248 |
| 2012/0281568 A1 | 11/2012 | Ho et al. | |
| 2013/0070716 A1 | 3/2013 | Kwon et al. | |
| 2013/0176953 A1 | 7/2013 | Stern-Berkowitz et al. | |
| 2014/0036879 A1 | 2/2014 | Pirskanen | |
| 2014/0349701 A1* | 11/2014 | Vajapeyam | H04W 52/32 455/522 |
| 2015/0003345 A1* | 1/2015 | Kuo | H04W 52/365 370/329 |
| 2015/0087296 A1 | 3/2015 | Kim et al. | |
| 2015/0195797 A1 | 7/2015 | Haim et al. | |
| 2016/0073362 A1 | 3/2016 | Xu et al. | |
| 2017/0142707 A1* | 5/2017 | Zhang | H04W 72/0426 |

\* cited by examiner (a) Control-Plane Protocol Stack (b) User-Plane Protocol Stack Component carrier 5 component carriers → 100 MHz (a) C-Plane connectivity of eNBs involved in dual connectivity (b) U-Plane connectivity of eNBs involved in dual connectivity

METHOD FOR POWER HEADROOM REPORTING AND DEVICE THEREFOR

This application is a 35 U.S.C. § 371 National Stage Entry of International Application No. PCT/KR2014/007111 filed Aug. 1, 2014, which claims benefit of and priority to U.S. Provisional Application No. 61/862,488 filed Aug. 5, 2013, each of which are incorporated by reference for all purposes as if fully set forth herein.

TECHNICAL FIELD

The present invention relates to a wireless communication system and, more particularly, to a method for power headroom reporting and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARM)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

An object of the present invention devised to solve the problem lies in a method and device for a method for power headroom reporting. The technical problems solved by the present invention are not limited to the above technical problems and those skilled in the art may understand other technical problems from the following description.

Technical Solution

The object of the present invention can be achieved by providing a method for operating by an apparatus in wireless communication system, the method comprising; obtaining information related to a power headroom (PH) for the second BS; obtaining PH of activated cells of the UE; and transmitting, to a first BS, the information related to the PH for the second BS and the PH of activated cells of the UE.

In another aspect of the present invention provided herein is an apparatus in the wireless communication system, the apparatus comprising: an RF (radio frequency) module; and a processor configured to control the RF module, wherein the processor is configured to obtain information related to a power headroom (PH) for the second BS, to obtain PH of activated cells of the UE, and to transmit to a first BS, the information related to the PH for the second BS and the PH of activated cells of the UE.

Preferably, wherein the information comprises a ratio of a PH for the second BS to a PH for the first BS.

Preferably, wherein the information comprises a ratio of a PH for the first BS to the PH of activated cells of the UE.

Preferably, wherein the information comprises scheduling information for the second BS.

Preferably, wherein the scheduling information indicates whether the UE received the UL grant for the second BS or not.

Preferably, wherein the scheduling information indicates whether the UE transmits the PH of the second BS to the second BS or not'.

It is to be understood that both the foregoing general description and the following detailed description of the present invention are exemplary and explanatory and are intended to provide further explanation of the invention as claimed.

Advantageous Effects

According to the present invention, power headroom reporting can be efficiently performed in a wireless communication system. Specifically, the UE can report power headroom to each base station efficiently in dual connectivity system.

It will be appreciated by persons skilled in the art that that the effects achieved by the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

BEST MODE

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
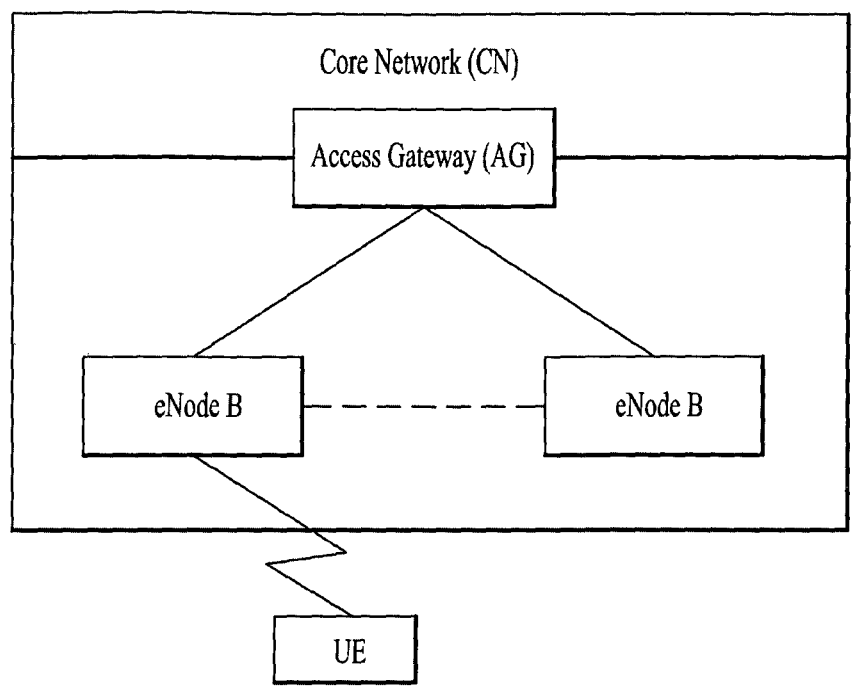
FIG. 1 is a diagram showing a network structure of an Evolved Universal Mobile Telecommunications System (E-UMTS) as an example of a wireless communication system.
Figure 2A:
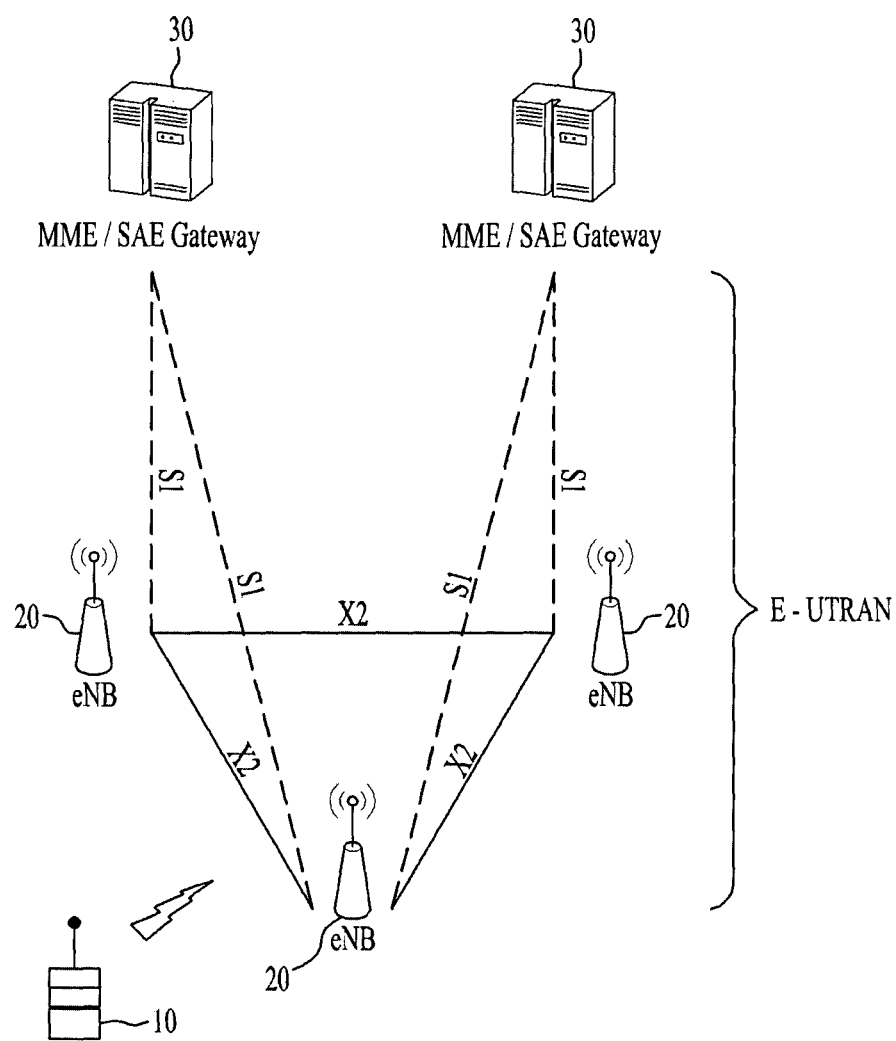
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
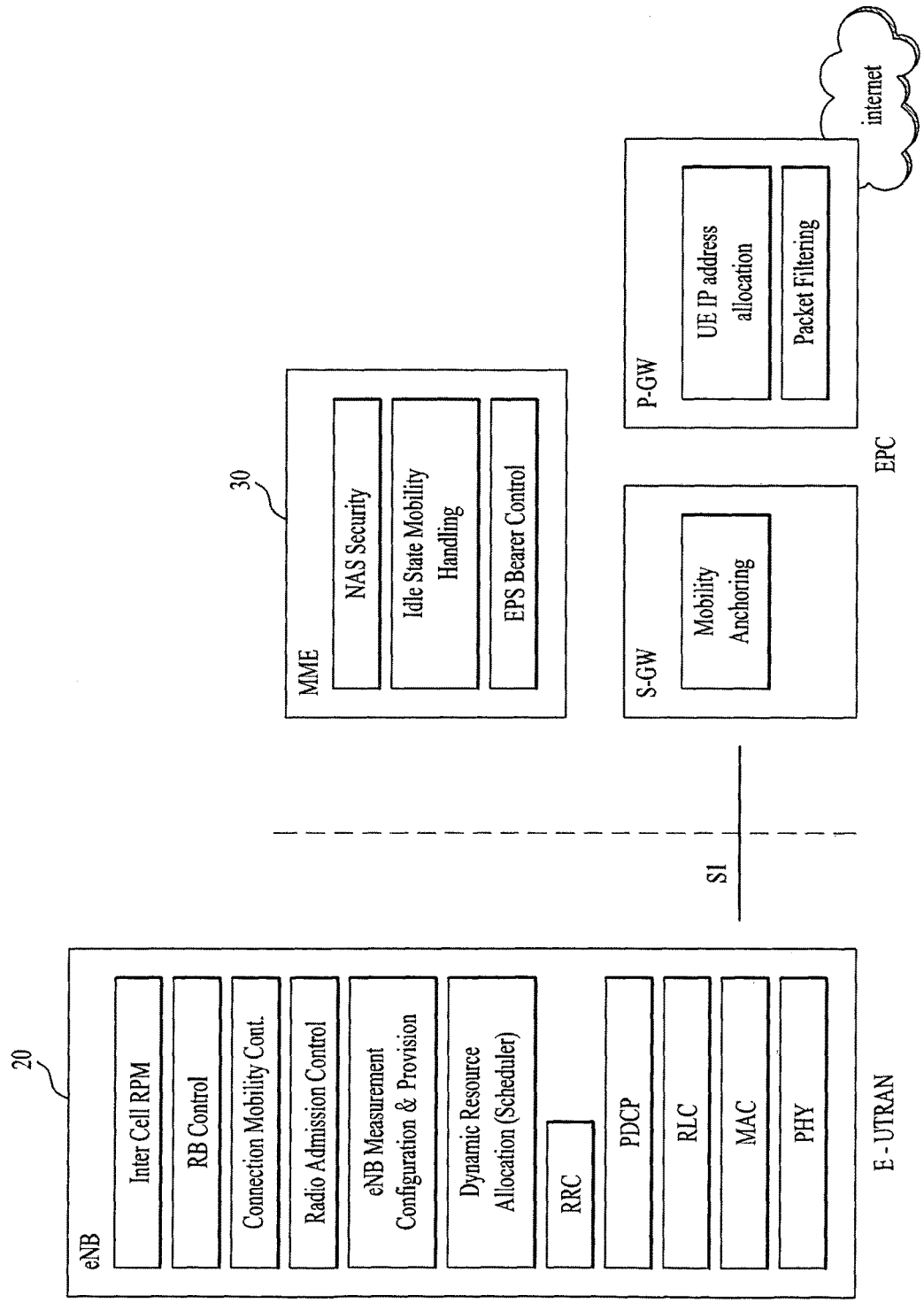
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
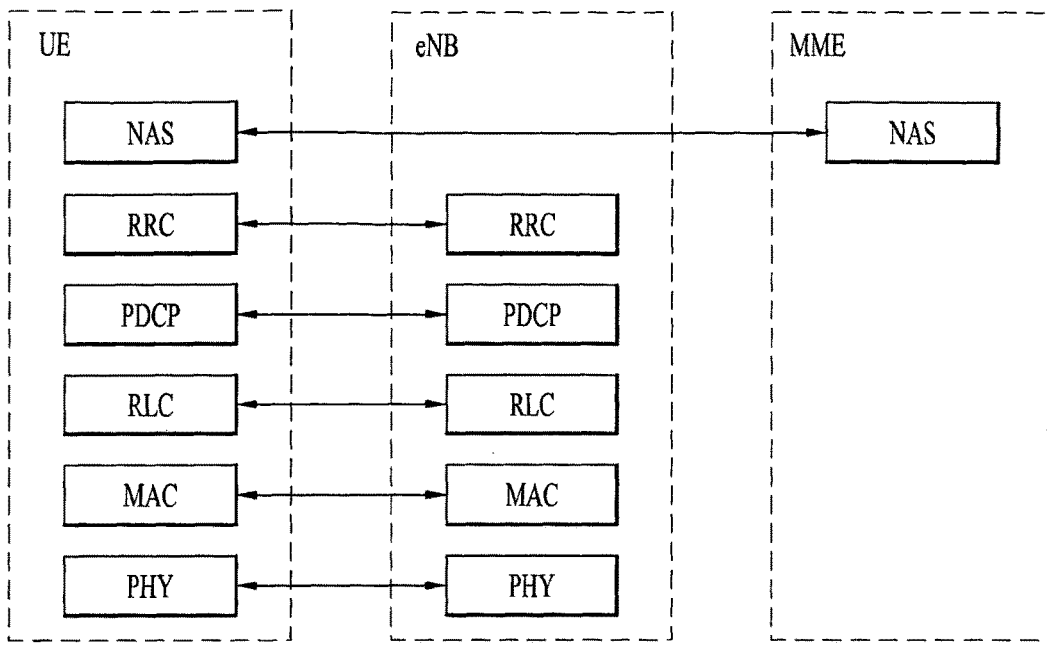
FIG. 3 is a diagram showing a control plane and a user plane of a radio interface protocol between a UE and an E-UTRAN based on a 3rd generation partnership project (3GPP) radio access network standard.
Figure 3:
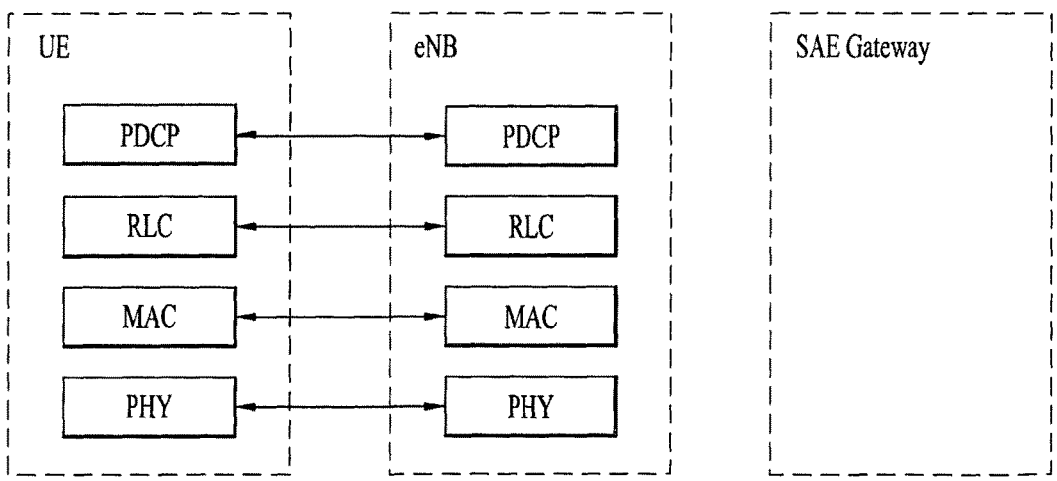

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an. Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
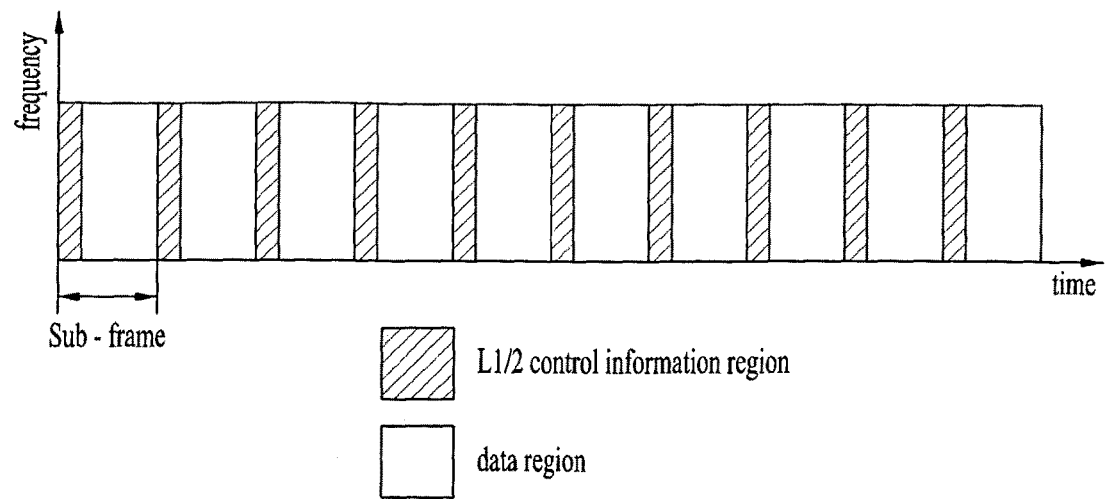
FIG. 4 is a diagram of an example physical channel structure used in an E-UMTS system.

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

Figure 5:
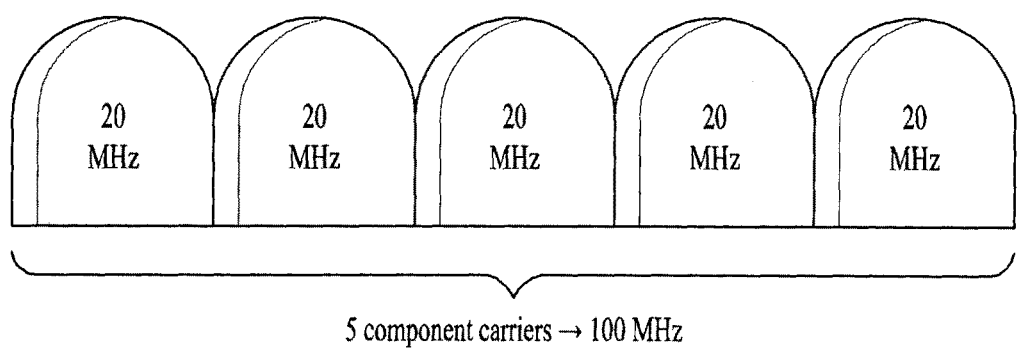
FIG. 5 is a diagram for carrier aggregation.

FIG. 5 is a diagram for carrier aggregation.

Carrier aggregation technology for supporting multiple carriers is described with reference to FIG. 5 as follows. As mentioned in the foregoing description, it may be able to support system bandwidth up to maximum 100 MHz in a manner of bundling maximum 5 carriers (component carriers: CCs) of bandwidth unit (e.g., 20 MHz) defined in a legacy wireless communication system (e.g., LTE system) by carrier aggregation. Component carriers used for carrier aggregation may be equal to or different from each other in bandwidth size. And, each of the component carriers may have a different frequency band (or center frequency). The component carriers may exist on contiguous frequency bands. Yet, component carriers existing on non-contiguous frequency bands may be used for carrier aggregation as well. In the carrier aggregation technology, bandwidth sizes of uplink and downlink may be allocated symmetrically or asymmetrically.

Multiple carriers (component carriers) used for carrier aggregation may be categorized into primary component carrier (PCC) and secondary component carrier (SCC). The PCC may be called P-cell (primary cell) and the SCC may be called S-cell (secondary cell). The primary component carrier is the carrier used by a base station to exchange traffic and control signaling with a user equipment. In this case, the control signaling may include addition of component carrier, setting for primary component carrier, uplink (UL) grant, downlink (DL) assignment and the like. Although a base station may be able to use a plurality of component carriers, a user equipment belonging to the corresponding base station may be set to have one primary component carrier only. If a user equipment operates in a single carrier mode, the primary component carrier is used. Hence, in order to be independently used, the primary component carrier should be set to meet all requirements for the data and control signaling exchange between a base station and a user equipment.

Meanwhile, the secondary component carrier may include an additional component carrier that can be activated or deactivated in accordance with a required size of transceived data. The secondary component carrier may be set to be used only in accordance with a specific command and rule received from a base station. In order to support an additional bandwidth, the secondary component carrier may be set to be used together with the primary component carrier. Through an activated component carrier, such a control signal as a UL grant, a DL assignment and the like can be received by a user equipment from a base station. Through an activated component carrier, such a control signal in UL as a channel quality indicator (CQI), a precoding matrix index (PMI), a rank indicator (RI), a sounding reference signal (SRS) and the like can be transmitted to a base station from a user equipment.

Resource allocation to a user equipment can have a range of a primary component carrier and a plurality of secondary component carriers. In a multi-carrier aggregation mode, based on a system load (i.e., static/dynamic load balancing), a peak data rate or a service quality requirement, a system may be able to allocate secondary component carriers to DL and/or UL asymmetrically. In using the carrier aggregation technology, the setting of the component carriers may be provided to a user equipment by a base station after RRC connection procedure. In this case, the RRC connection may mean that a radio resource is allocated to a user equipment based on RRC signaling exchanged between an RRC layer of the user equipment and a network via SRB. After completion of the RRC connection procedure between the user equipment and the base station, the user equipment may be provided by the base station with the setting information on the primary component carrier and the secondary component carrier. The setting information on the secondary component carrier may include addition/deletion (or activation/deactivation) of the secondary component carrier. Therefore, in order to activate a secondary component carrier between a base station and a user equipment or deactivate a previous secondary component carrier, it may be necessary to perform an exchange of RRC signaling and MAC control element.

The activation or deactivation of the secondary component carrier may be determined by a base station based on a quality of service (QoS), a load condition of carrier and other factors. And, the base station may be able to instruct a user equipment of secondary component carrier setting using a control message including such information as an indication type (activation/deactivation) for DL/UL, a secondary component carrier list and the like.

Figure 6:
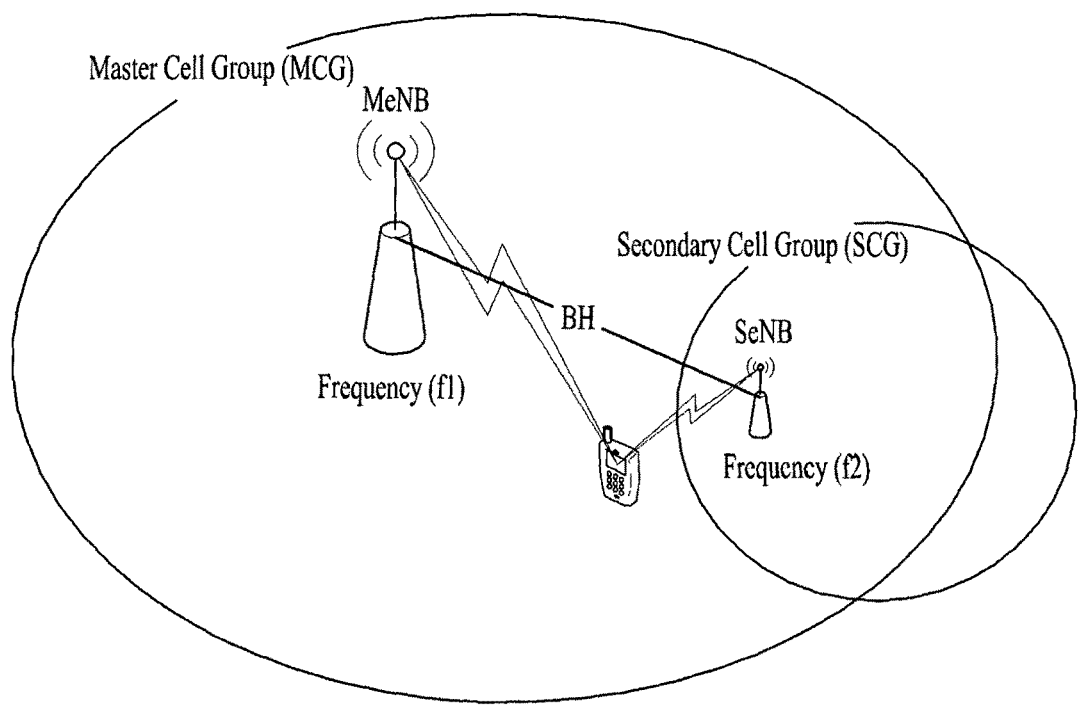
FIG. 6 is a conceptual diagram for dual connectivity between a Master Cell Group (MCG) and a Secondary Cell Group (SCG)

FIG. 6 is a conceptual diagram for dual connectivity (DC) between a Master Cell Group (MCG) and a Secondary Cell Group (SCG).

The dual connectivity means that the UE can be connected to both a Master eNode-B (MeNB) and a Secondary eNode-B (SeNB) at the same time. The MCG is a group of serving cells associated with the MeNB, comprising of a PCell and optionally one or more SCells. And the SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface (BH) between the MeNB and the SeNB is non-ideal (e.g. X2 interface), which means that there is considerable delay in the backhaul and therefore the centralized scheduling in one node is not possible.

Figure 7A:
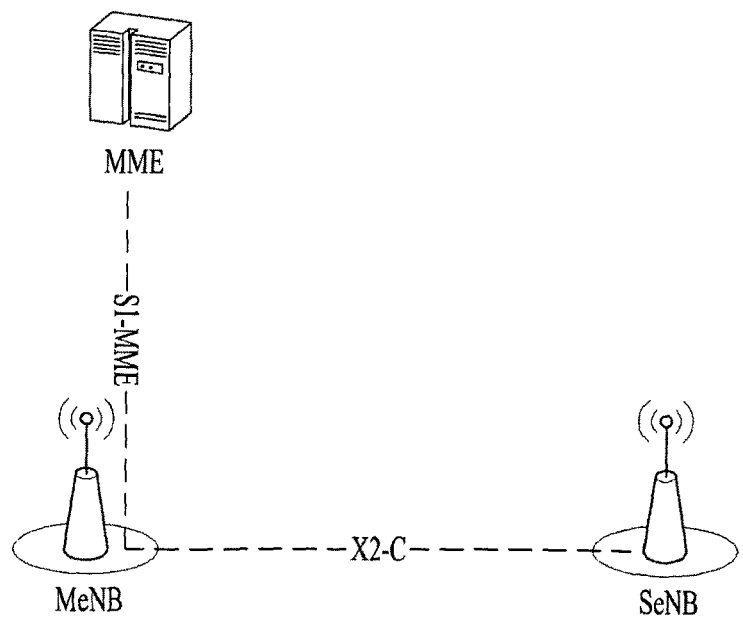
FIG. 7a is a conceptual diagram for C-Plane connectivity of base stations involved in dual connectivity.
Figure 7B:
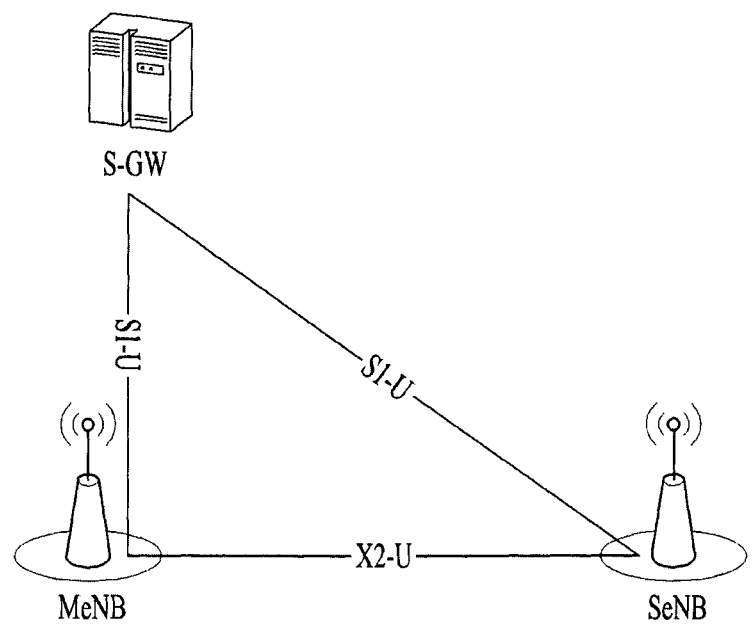
FIG. 7b is a conceptual diagram for U-Plane connectivity of base stations involved in dual connectivity.

FIG. 7a is a conceptual diagram for C-Plane connectivity of base stations involved in dual connectivity, and FIG. 7b is a conceptual diagram for U-Plane connectivity of base stations involved in dual connectivity.

FIG. 7a shows C-plane (Control Plane) connectivity of eNBs involved in dual connectivity for a certain UE. The MeNB is C-plane connected to the MME via S1-MME, the MeNB and the SeNB are interconnected via X2-C (X2-Control plane). As FIG. 7a, Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling.

FIG. 7b shows U-plane connectivity of eNBs involved in dual connectivity for a certain UE. U-plane connectivity depends on the bearer option configured: i) For MCG bearers, the MeNB is U-plane connected to the S-GW via S1-U, the SeNB is not involved in the transport of user plane data, ii) For split bearers, the MeNB is U-plane connected to the S-GW via S1-U and in addition, the MeNB and the SeNB are interconnected via X2-U, and iii) For SCG bearers, the SeNB is directly connected with the S-GW via S1-U. If only MCG and split bearers are configured, there is no S1-U termination in the SeNB. In the dual connectivity, enhancement of the small cell is required in order to data offloading from the group of macro cells to the group of small cells. Since the small cells can be deployed apart from the macro cells, multiple schedulers can be separately located in different nodes and operate independently from the UE point of view. This means that different scheduling node would encounter different radio resource environment, and hence, each scheduling node may have different scheduling results.

Figure 8:
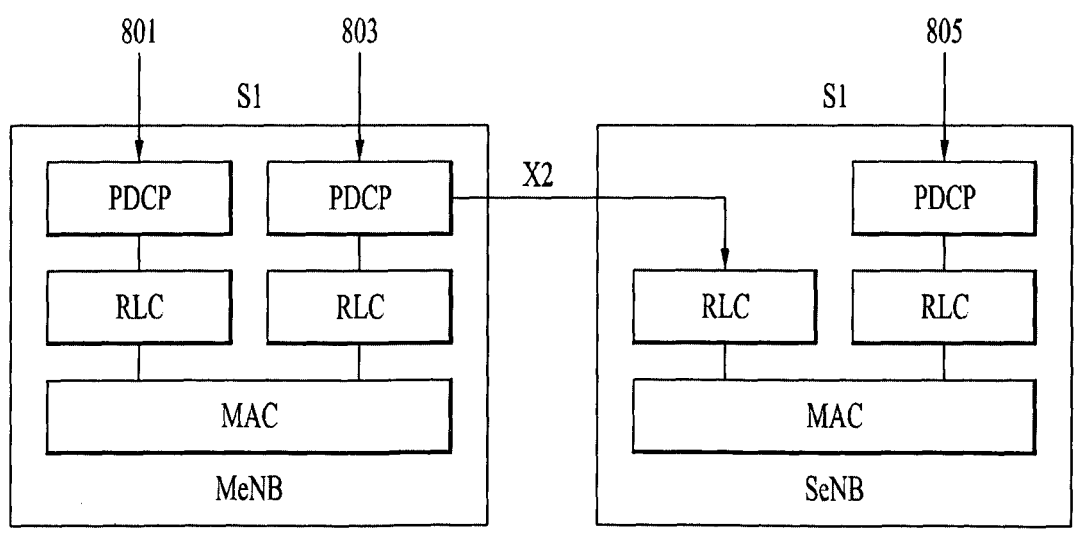
FIG. 8 is a conceptual diagram for radio protocol architecture for dual connectivity.

FIG. 8 is a conceptual diagram for radio protocol architecture for dual connectivity.

E-UTRAN of the present example can support dual connectivity operation whereby a multiple receptions/transmissions (RX/TX) UE in RRC_CONNECTED is configured to utilize radio resources provided by two distinct schedulers, located in two eNBs (or base stations) connected via a non-ideal backhaul over the X2 interface. The eNBs involved in dual connectivity for a certain UE may assume two different roles: an eNB may either act as the MeNB or as the SeNB. In dual connectivity, a UE can be connected to one MeNB and one SeNB.

In the dual connectivity operation, the radio protocol architecture that a particular bearer uses depends on how the bearer is setup. Three alternatives exist, MCG bearer (801), split bearer (803) and SCG bearer (805). Those three alternatives are depicted on FIG. 8. The SRBs (Signaling Radio Bearers) are always of the MCG bearer and therefore only use the radio resources provided by the MeNB. The MCG bearer (801) is a radio protocol only located in the MeNB to use MeNB resources only in the dual connectivity. And the SCG bearer (805) is a radio protocol only located in the SeNB to use SeNB resources in the dual connectivity.

Specially, the split bearer (803) is a radio protocol located in both the MeNB and the SeNB to use both MeNB and SeNB resources in the dual connectivity and the split bearer (803) may be a radio bearer comprising one Packet Data Convergence Protocol (PDCP) entity, two Radio Link Control (RLC) entities and two Medium Access Control (MAC) entities for one direction. Specially, the dual connectivity operation can also be described as having at least one bearer configured to use radio resources provided by the SeNB.

Figure 9:
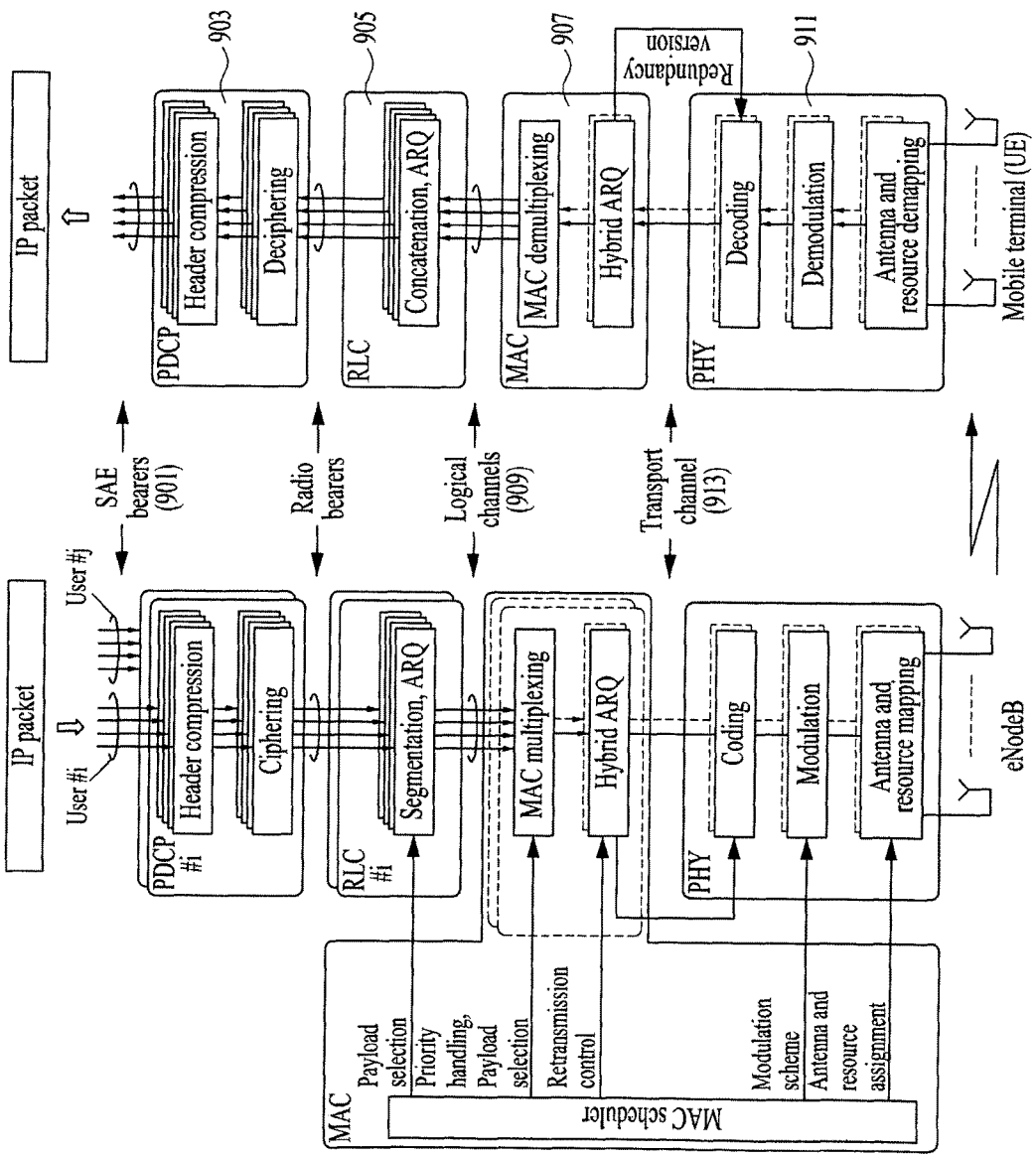
FIG. 9 is a diagram for a general overview of the LTE protocol architecture for the downlink.

FIG. 9 is a diagram for a general overview of the LTE protocol architecture for the downlink.

A general overview of the LTE protocol architecture for the downlink is illustrated in FIG. 9. Furthermore, the LTE protocol structure related to uplink transmissions is similar to the downlink structure in FIG. 9, although there are differences with respect to transport format selection and multi-antenna transmission.

Data to be transmitted in the downlink enters in the form of IP packets on one of the SAE bearers (901). Prior to transmission over the radio interface, incoming IP packets are passed through multiple protocol entities, summarized below and described in more detail in the following sections:

Packet Data Convergence Protocol (PDCP, 903) performs IP header compression to reduce the number of bits necessary to transmit over the radio interface. The header-compression mechanism is based on ROHC, a standardized header-compression algorithm used in WCDMA as well as several other mobile-communication standards. PDCP (903) is also responsible for ciphering and integrity protection of the transmitted data. At the receiver side, the PDCP protocol performs the corresponding deciphering and decompression operations. There is one PDCP entity per radio bearer configured for a mobile terminal.

Radio Link Control (RLC, 905) is responsible for segmentation/concatenation, retransmission handling, and in-sequence delivery to higher layers. Unlike WCDMA, the RLC protocol is located in the eNodeB since there is only a single type of node in the LTE radio-access-network architecture. The RLC (905) offers services to the PDCP (903) in the form of radio bearers. There is one RLC entity per radio bearer configured for a terminal.

Medium Access Control (MAC, 907) handles hybrid-ARQ retransmissions and uplink and downlink scheduling. The scheduling functionality is located in the eNodeB, which has one MAC entity per cell, for both uplink and downlink. The hybrid-ARQ protocol part is present in both the transmitting and receiving end of the MAC protocol. The MAC (907) offers services to the RLC (905) in the form of logical channels (909).

Physical Layer (PHY, 911), handles coding/decoding, modulation/demodulation, multi-antenna mapping, and other typical physical layer functions. The physical layer (911) offers services to the MAC layer (907) in the form of transport channels (913).

The MAC (907) offers services to the RLC (905) in the form of logical channels (909). A logical channel (909) is defined by the type of information it carries and are generally classified into control channels, used for transmission of control and configuration information necessary for operating an LTE system, and traffic channels, used for the user data.

Figure 10:
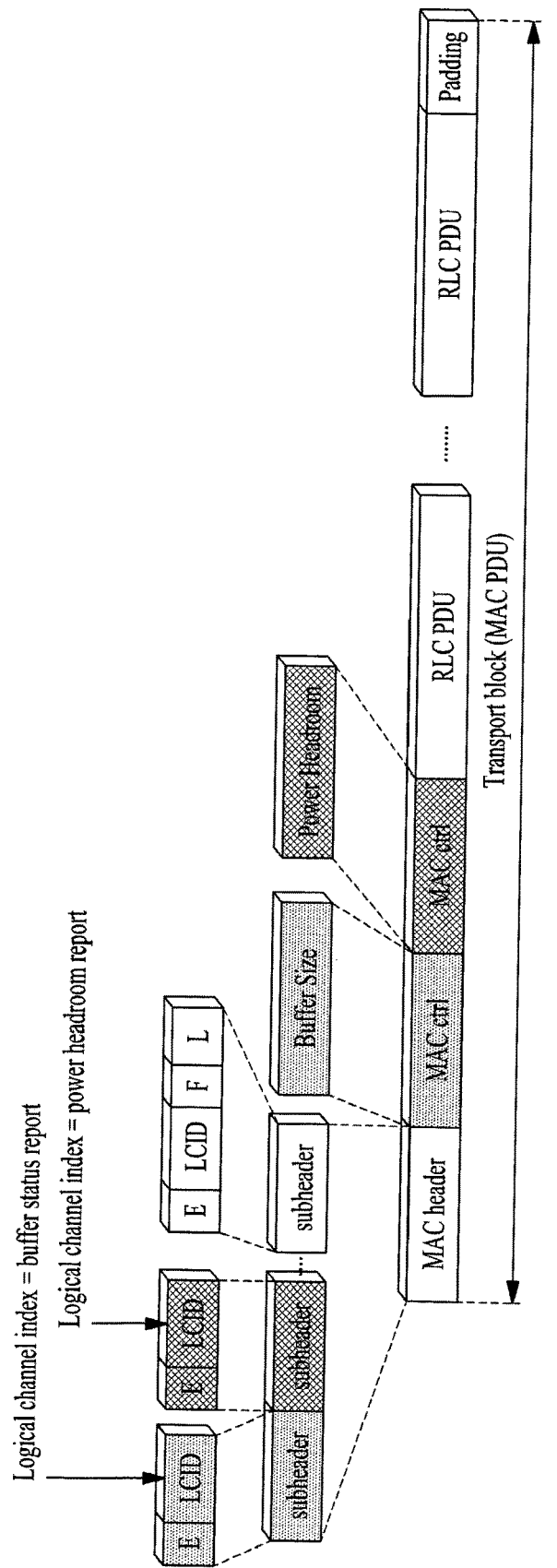
FIG. 10 is a diagram for signaling of buffer status and power-headroom reports.

FIG. 10 is a diagram for signaling of buffer status and power-headroom reports.

The scheduler needs knowledge about the amount of data awaiting transmission from the terminals to assign the proper amount of uplink resources. Obviously, there is no need to provide uplink resources to a terminal with no data to transmit as this would only result in the terminal performing padding to fill up the granted resources. Hence, as a minimum, the scheduler needs to know whether the terminal has data to transmit and should be given a grant. This is known as a scheduling request.

The use of a single bit for the scheduling request is motivated by the desire to keep the uplink overhead small, as a multi-bit scheduling request would come at a higher cost. A consequence of the single bit scheduling request is the limited knowledge at the eNodeB about the buffer situation at the terminal when receiving such a request. Different scheduler implementations handle this differently. One possibility is to assign a small amount of resources to ensure that the terminal can exploit them efficiently without becoming power limited. Once the terminal has started to transmit on the UL-SCH, more detailed information about the buffer status and power headroom can be provided through the inband MAC control message, as discussed below.

Terminals that already have a valid grant obviously do not need to request uplink resources. However, to allow the scheduler to determine the amount of resources to grant to each terminal in future subframes, information about the buffer situation and the power availability is useful, as discussed above. This information is provided to the scheduler as part of the uplink transmission through MAC control element. The LCID field in one of the MAC subheaders is set to a reserved value indicating the presence of a buffer status report, as illustrated in FIG. 10.

Especially, to assist the scheduler in the selection of a combination of modulation-and-coding scheme and resource size M that does not lead to the terminal being power limited, the terminal can be configured to provide regular power headroom reports on its power usage. There is a separate transmit-power limitation for each component carrier. Thus, power headroom should be measured and reported separately for each component carrier.

There are two different types of power-headroom reports defined for LTE release 10, Type 1 and Type 2. Type 1 reporting reflects the power headroom assuming PUSCH-only transmission on the carrier, while the Type-2 report assumes combined PUSCH and PUCCH transmission.

The Type-1 power headroom valid for a certain subframe, assuming that the terminal was really scheduled for PUSCH transmission in that subframe, is given by the following expression:

$$\text{Power Headroom} = P_{CMAX,c} - (P_{0,PUSCH} + \alpha \cdot PL_{DL} + 10 \cdot \log_{10}(M) + \Delta_{MCS} + \delta), \quad \text{[Equation 1]}$$

Where the values for M and $\Delta_{MCS}$ correspond to the resource assignment and modulation-and-coding scheme used in the subframe to which the power-headroom report corresponds. It can be noted that the power headroom is not a measure of the difference between the maximum per-carrier transmit power and the actual carrier transmit power. It can be seen that the power headroom is a measure of the difference between $P_{CMAX,c}$ and the transmit power that would have been used assuming that there would have been no upper limit on the transmit power. Thus, the power headroom can very well be negative. More exactly, a negative power headroom indicates that the per-carrier transmit power was limited by $P_{CMAX,c}$ at the time of the power headroom reporting. As the network knows what modulation-and-coding scheme and resource size the terminal used for transmission in the subframe to which the power-headroom report corresponds, it can determine what are the valid combinations of modulation-and-coding scheme and resource size M, assuming that the downlink path loss $PL_{DL}$ and the term $\delta$ have not changed substantially.

Type-1 power headroom can also be reported for subframes where there is no actual, PUSCH transmission. In such cases, 10·log 10 (M) and $\Delta_{MCS}$ in the expression above are set to zero:

$$\text{Power Headroom} = P_{CMAX,c} - (P_{0,PUSCH} + \alpha \cdot PL_{DL} + \delta). \quad \text{[Equation 2]}$$

This can be seen as the power headroom assuming a default transmission configuration corresponding to the minimum possible resource assignment (M=1) and the modulation-and-coding scheme associated with $\Delta_{MCS}$=0 dB.

Similarly, Type-2 power headroom reporting is defined as the difference between the maximum per-carrier transmit power and the sum of the PUSCH and PUCCH transmit power respectively, once again not taking into account any maximum per-carrier power when calculating the PUSCH and PUCCH transmit power.

Similar to Type-1 power headroom reporting, the Type-2 power headroom can also be reported for subframes in which no PUSCH and/or PUCCH is transmitted. In that case a virtual PUSCH and or PUCCH transmit power is calculated, assuming the smallest possible resource assignment (M=1) and $\Delta_{MCS}$=0 dB for PUSCH and $\Delta_{Format}$=0 for PUCCH.

For the uplink, the power availability, or power headroom is defined as the difference between the nominal maximum output power and the estimated output power for UL-SCH transmission. This quantity can be positive as well as negative (on a dB scale), where a negative value would indicate that the network has scheduled a higher data rate than the terminal can support given its current power availability. The power headroom depends on the power-control mechanism and thereby indirectly on factors such as the interference in the system and the distance to the base stations.

Information about the power headroom is fed back from the terminals to the eNodeB in a similar way as the buffer-status reports—that is, only when the terminal is scheduled to transmit on the UL-SCH. Type-1 reports are provided for all component carriers simultaneously, while Type-2 reports are provided for the primary component carrier only.

A power headroom report can be triggered for the following reasons:
  Periodically as controlled by a timer.
  Change in path loss, since the last power headroom report is larger than a (configurable) threshold.
  Instead of padding (for the same reason as buffer-status reports).

It is also possible to configure a prohibit timer to control the minimum time between two power-headroom reports and thereby the signaling load on the uplink.

Figure 11:
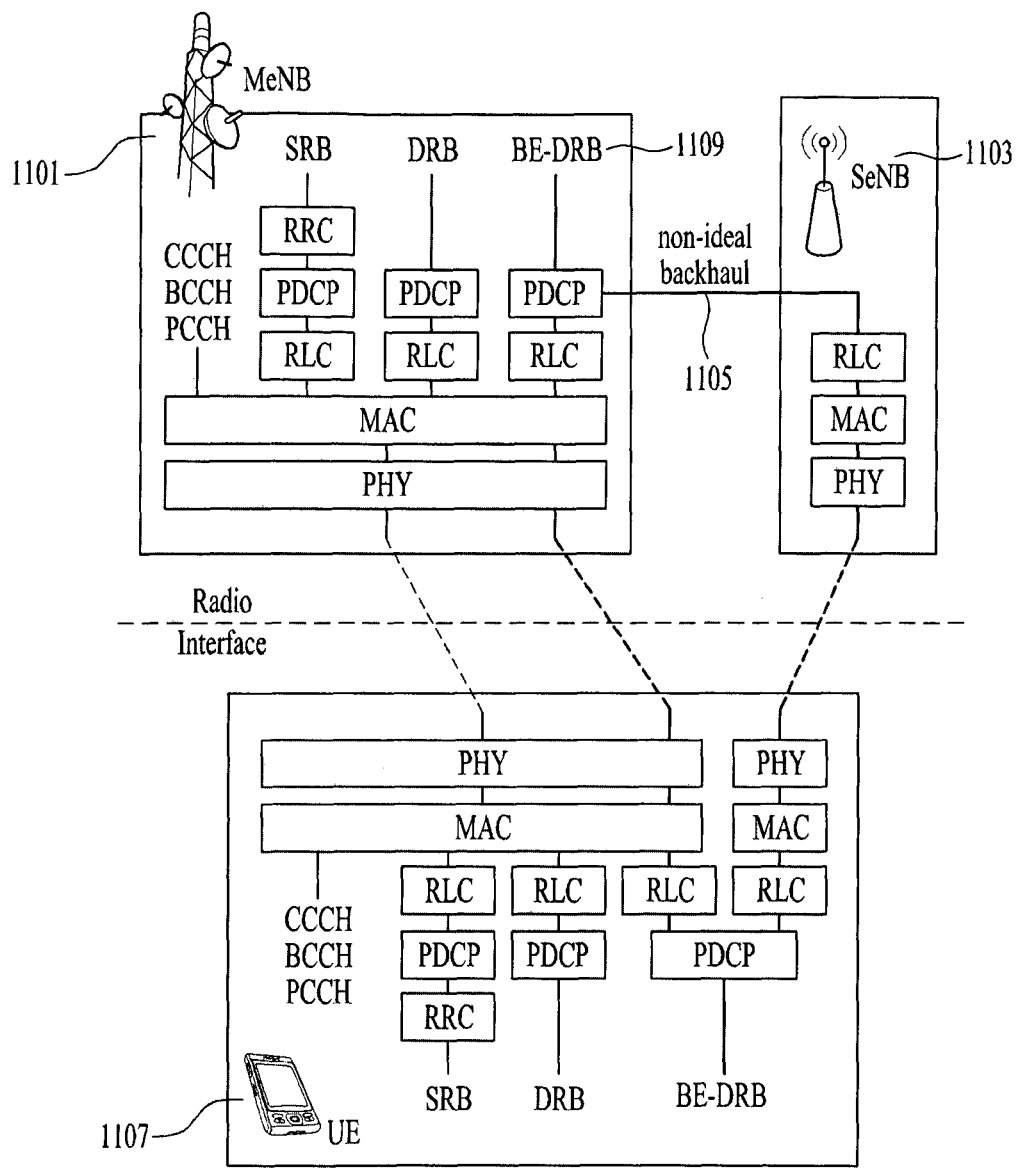
FIG. 11 is a conceptual diagram for one of radio protocol architecture for dual connectivity.

FIG. 11 is a conceptual diagram for one of radio protocol architecture for dual connectivity.

The UE transmits Buffer Status Report (BSR) to the eNB to assist the eNB in allocating the uplink radio resources to the different UEs by indicating the amount of data buffered across the UE's PDCP and RLC memory. The BSR shall be triggered by the timers and the events as described in the above Prior Art. For example, there are timers, i.e., retxBSR-Timer and periodic BSR-Timer, which triggers BSR upon timer expiry.

However, in LTE Rel-12, a new study on dual connectivity, i.e. UE is connected to both MeNB (1101) and SeNB (1103), as shown in FIG. 11. In this figure, the interface between MeNB (1101) and SeNB (1103) is called Xn interface (1105). The Xn interface (1105) is assumed to be non-ideal; i.e. the delay in Xn interface could be up to 60 ms, but it is not limited thereto.

To support dual connectivity, one of the potential solutions is for the UE (1107) to transmit data to both MeNB (1101) and SeNB (113) utilizing a new RB structure called dual RLC/MAC scheme, where a single RB has one PDCP-two RLCs-two MACs for one direction, and RLC/MAC pair is configured for each cell, as shown in FIG. 11. In this figure, BE-DRB (1109) stands for DRB for Best Effort traffic.

In this case, the UE can perform the UL transmission through MeNB (1101) and SeNB (1103), which are located in different areas. Since each UL transmission to MeNB (1101) and SeNB (1103) will experience different radio environment, e.g., pathloss, it is desirable that the eNB knows the power headroom of MCG and SCG independently. However, if the UE reports the power headroom of each cell to the corresponding eNB, each eNB would estimate the power headroom of the UE incorrectly because the MeNB (1101) does not know the PHR for SeNB (1103) and vice versa. Based on the provided PHR from the UE, each eNB may schedule more uplink resources for the UE.

Accordingly, in the UE side, the sum of transmission power on UL-SCH across the MCG and SCG would exceed the maximum transmit power.

Figure 12:
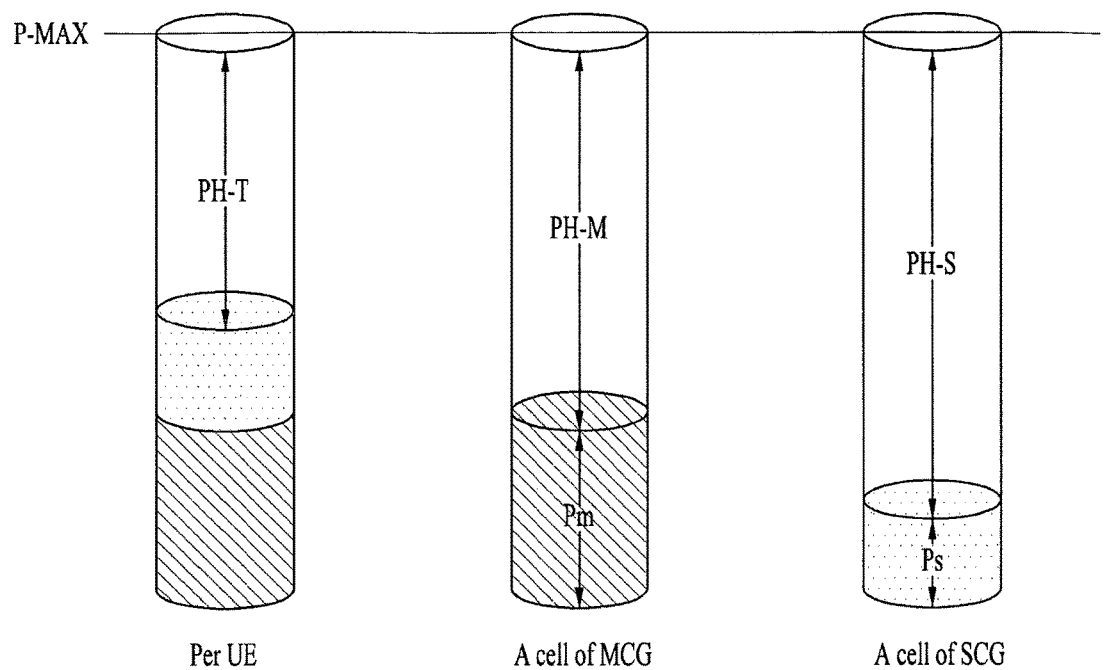
FIG. 12 is a conceptual diagram for a problematic case in dual connectivity.

FIG. 12 is a conceptual diagram for a problematic case in dual connectivity.

For example, the nominal UE maximum transmit power is P-MAX and the UE calculates that PH for the one cell of MCG and one cell of SCG as PH-M and PH-S, respectively, and sends them to the corresponding MeNB and SeNB.

Note that the total power headroom the UE is PH-T, which cannot be deduced solely from the PH-M or PH-S. When each eNB receives those PHR, the MeNB analyzes that there is PH-M remaining power resource for the UE, and the SeNB analyzes that there is PH-S remaining power resource for the UE. As a result, the MeNB and the SeNB allocates additional resources based on PH-M and PH-S so that additional power PH-M+PH-S would be required for the UE, which exceeds actual total PH of the UE (PH-T).

Figure 13:
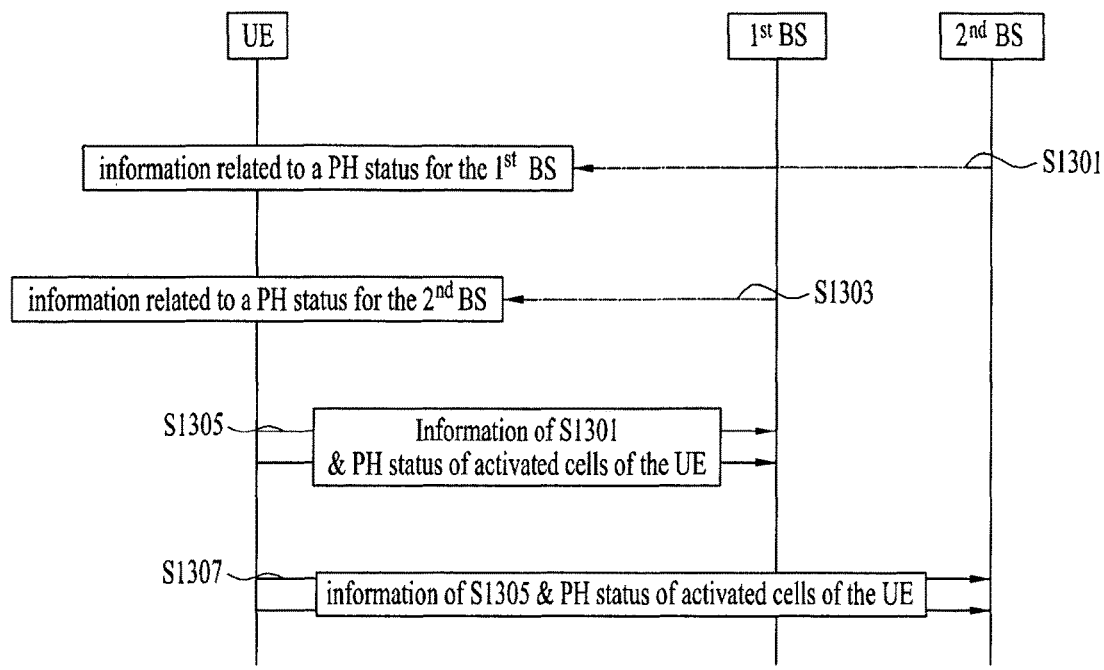
FIGS. 13 and 14 are conceptual diagrams for power headroom reporting according to embodiments of the present invention.

FIG. 13 is a conceptual diagram for power headroom reporting according to embodiments of the present invention.

The dual connectivity means that the UE can be connected to both a first base station and a second base station at the same time. The first base station may be a Master eNode-B (MeNB) and the second base station may be a Secondary eNode-B (SeNB), and vice versa.

A MCG is a group of serving cells associated with the MeNB, comprising of a PCell and optionally one or more SCells. And a SCG is a group of serving cells associated with the SeNB, comprising of the special SCell and optionally one or more SCells. The MeNB is an eNB which terminates at least S1-MME (S1 for the control plane) and the SeNB is an eNB that is providing additional radio resources for the UE but is not the MeNB.

With dual connectivity, some of the data radio bearers (DRBs) can be offloaded to the SCG to provide high throughput while keeping scheduling radio bearers (SRBs) or other DRBs in the MCG to reduce the handover possibility. The MCG is operated by the MeNB via the frequency of f1, and the SCG is operated by the SeNB via the frequency of f2. The frequency f1 and f2 may be equal. The backhaul interface between the MeNB and the SeNB is non-ideal, which means that there is considerable delay in the backhaul and therefore the centralized scheduling in one node is not possible.

In this invention, to prevent the eNB from over-allocation of uplink resources to the UE with a dual connectivity, if the UE has a dual connectivity with a first base station and a second base station, when the UE reports Power Headroom (PH) of first cell to an base station of the first cell, the UE adds additional information that indicates the PH of the UE in the same PHR. Additionally, the UE adjusts the PH of each cell taking into consideration of the PH of the UE and transmits them to each base station.

When the PHR is triggered, if the UE is connected to the first base station and the second base station, the UE firstly calculates the PH for each cell using the nominal UE maximum transmit power ($P_{CMAX,c}$) as in the prior art.

The UE may obtain information related to a power headroom (PH) status for the second BS (S1301) or information related to a PH for the first BS (S1303).

Desirably, the information may comprise a ratio of a PH for the second BS (PH-S) to a PH for the first BS (PH-M). The information may comprise a ratio of a PH for the first BS (PH-M) to the PH of activated cells of the UE (PH-T).

Or, the information may comprise a ratio of a PH for the second BS (PH-S) to the PH of activated cells of the UE (PH-T).

For example, the current a PH for the first BS (PH-M) and a PH for the second BS (PH-S) are 10 and 20. If the information comprises a ratio of a PH for the second BS to a PH for the first BS, the UE may calculate the ratio as PH-S/PH-M or PH-M/PH-S for the first BS and the second BS, respectively, i.e., 2 or ½.

If the information may comprise a ratio of a PH for the first BS (PH-M) to the PH of activated cells of the UE (PH-T), then the UE may calculate the ratio as PH-M/PH-T and PH-S/PH-T for the first BS and the second BS, i.e., 2 and 4, respectively.

When the UE calculates the ratio using the PH-M, PH-S, and PH-T, the UE may transmit the ratio along with the PH-M and PH-S to the MeNB and SeNB, respectively, in the same PHR.

The UE may transmit the ratio as PH-S/PH-M (i.e., 2) or PH-M/PH-T (i.e., 2) to the first base station with PH of activated cells of the UE (S1305).

The UE may transmit the ratio as PH-M/PH-S (i.e., ½) or PH-S/PH-T (i.e., 4) to the second base station with PH of activated cells of the UE (S1307).

When the UE transmits the ratio to the corresponding base station, the first base station analyzes that the UE reports PHR to the second eNB with the PH multiplied by the RATIO-PH. In the above example, when UE transmits the PH-M=10 to the first base station and the ratio=PH-S/PH-M=2, then the first base station analyzes that the UE transmits the PH-S=20 to the second base station. If the UE transmits the PH-M=10 and the ratio=PH-S/PH-M=2 to the first base station, then the first base station analyzes that the PH of the UE is 5 and knows that the UE sends the PH of the one of cells served by the second base station to the second base station.

By the way, in the step of S1301 and S1303, desirably, the information may comprise scheduling information for the second BS. Or, the information may comprise scheduling information for the first BS.

Desirably, the scheduling information may indicate whether the UE received the UL grant for the second BS when the UE transmits the scheduling information to the first base station along with the PH of activated cells of the UE. On the other hands, the scheduling information may indicate whether the UE received the UL grant for the first BS when the UE transmits the scheduling information to the second base station along with the PH of activated cells of the UE.

Desirably, the scheduling information may indicate whether the UE transmits the PH for one of cells served by the second base station to the second base station when the UE transmits the scheduling information to the first base station along with the PH of activated cells of the UE. On the other hands, the scheduling information may indicate whether the UE transmits the PH for one of cells served by the first base station to the first base station when the UE transmits the scheduling information to the second base station along with the PH of activated cells of the UE.

Desirably, the scheduling information may indicate whether the UE transmits a larger/smaller PH for one of cells served by the second base station to the second base station when the UE transmits the scheduling information to the first base station along with the PH of activated cells of the UE. On the other hands, the scheduling information may indicate whether the UE transmits a larger/smaller PH for one of cells served by the first base station to the first base station when the UE transmits the scheduling information to the second base station along with the PH of activated cells of the UE.

Desirably, the scheduling information may indicate whether the UE's overall PH of the UE is less or equal to the PH for one of cells served by the first base station or not. Or the scheduling information may indicate whether the UE's overall PH of the UE is less or equal to the PH for one of cells served by the second base station or not.

When the UE reports the PH of cells served by each base station (the first base station and the second base station) to the corresponding base station, the UE sends the scheduling information that indicates the overall status of PH of the UE along with the PH in the same PHR (S1305 & S1307).

Upon receiving the scheduling information from the UE that indicates the overall status of PH of the UE along with the PH in the same PHR, the corresponding base station analyzes whether the actual PH of the UE is smaller or equal to the received PH or not.

Figure 14:
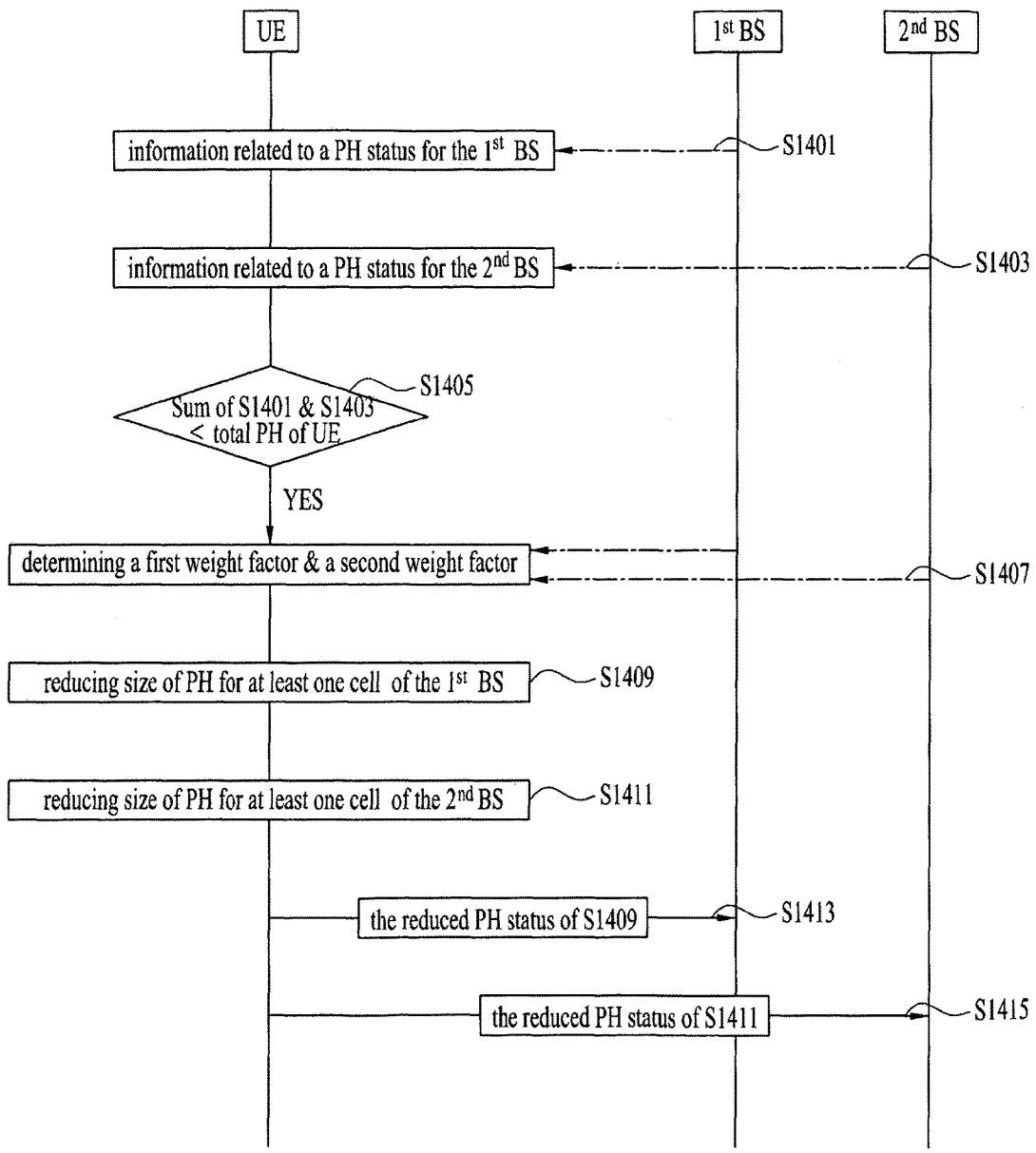

FIG. 14 is a conceptual diagram for power headroom reporting according to embodiments of the present invention.

When the UE reports the PH of cells served by each base station (the first base station and the second base station) to the corresponding base station, the UE may adjusts the PH using the Power Headroom per UE (PH-T).

In detail, the UE adjusts the PH-M and PH-S using weight factors a first weight factor ($W_M$) and a second weigh factor ($W_S$) so that the sum of PH-M and PH-S is smaller than the PH-T.

For this purpose, the UE may obtain information related to a PH for the first base station (S1401) and a PH for the second base station (S1403). The UE may determine the first weight factor for the first base station and a second weigh factor for the second base station (S1407) if sum of a power headroom (PH) status for the first base station and a PH for the second base station is more than a PH of activated cells of the UE (S1405).

Desirably, the first weigh factor may be determined by using: a value of the PH for the first base station over a value of the PH of activated cells of the UE. And the second weigh factor is determined by using: a value of the PH for the second BS over a value of the PH of activated cells of the UE.

The UE adaptively calculates the weight factor as $W_M$=PH-M/(PH-M+PH-S) and $W_S$=PH-S/(PH-M+PH-S) for the first base station and the second base station, respectively. For example, if the current PH-M and PH-S are 20 and 10, respectively, and if the PH-T is 5, then the UE adjusts the PH-M and PH-S as PH-T×$W_M$=5×10/(10+20)= 5/3 and PH-S×$W_S$=5×20/(10+20)=10/3.

Desirably, the first weight factor and the second weight factor may be transmitted by at least the first base station or the second base station using a MAC/RRC signaling.

Alternatively, the UE uses the fixed weight values of $W_M$ and $W_S$ where the sum of $W_M$ and $W_S$ equals to 1. For example, if $W_M$ and $W_S$ are 0.7 and 0.3 respectively, and the current PH-T is 10, then the UE adjusts the PH-M and PH-S as PH-T×$W_M$=10×0.7=7 and PH-S×$W_S$=10×0.3=3.

Alternatively, the UE uses the fixed weight values of $W_M$ and $W_S$ where the sum of $W_M$ and $W_S$ does not necessarily equal to 1. Those weight values are used to scale down the PH of each cell. The UE can be configured with the fixed weight values from the the first base station or the second base station using a MAC/RRC signaling.

For example, if $W_M$ and $W_S$ are 0.4 and 0.5 respectively, and the current PH-M and PH-S are 20 and 10, then the UE adjusts the PH-M and PH-S as PH-M×$W_M$=20×0.4=8 and PH-S×$W_S$=10×0.5=5.

The UE may reduce size of PH for at least one cell of the first BS by using the first weight factor (S1409) and report the reduced PH for at least one cell of the first BS to the first BS (S1413).

The UE may reduce size of PH for at least one cell of the second BS by using the second weight factor (S1411) and report the reduced PH for at least one cell of the second BS to the second BS (S1415).

Figure 15:
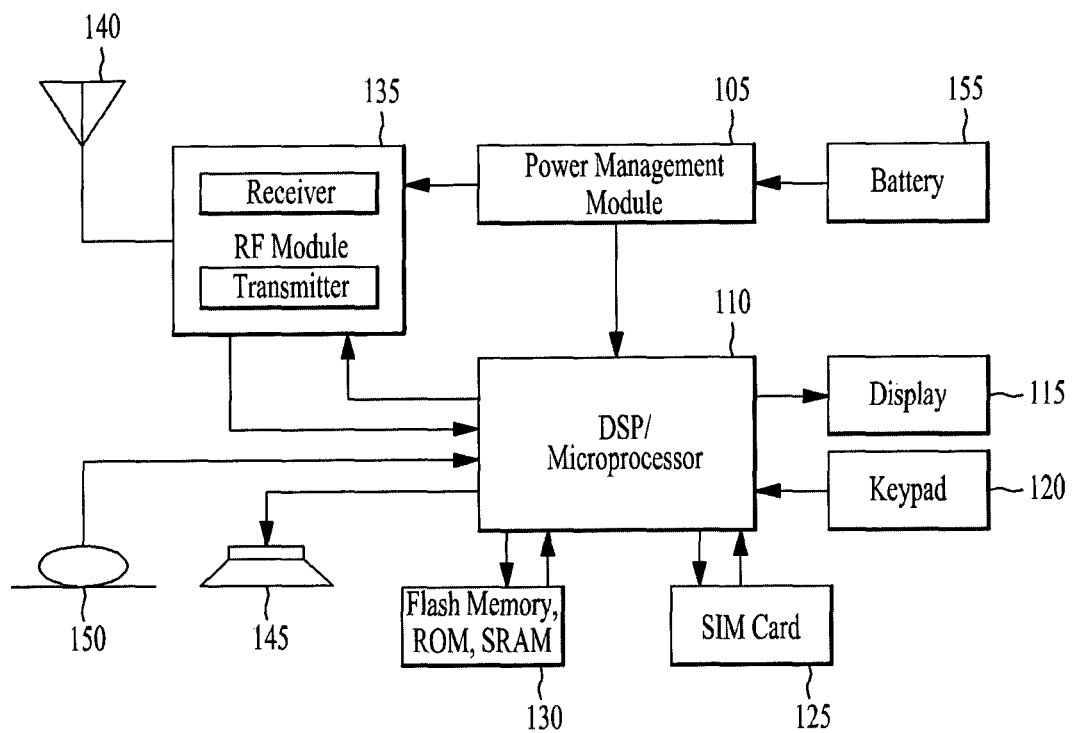
FIG. 15 is a block diagram of a communication apparatus according to an embodiment of the present invention.

FIG. 15 is a block diagram of a communication apparatus according to an embodiment of the present invention.

The apparatus shown in FIG. 15 can be a user equipment (UE) and/or eNB adapted to perform the above mechanism, but it can be any apparatus for performing the same operation.

As shown in FIG. 15, the apparatus may comprises a DSP/microprocessor (110) and RF module (transmiceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 15 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 15 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The embodiments of the present invention described herein below are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) operating in a wireless communication system comprising a first base station (BS) and a second BS, the method comprising:
obtaining information related to a power headroom (PH) for the second BS;
obtaining both a PH value for a first cell and a total PH value for activated cells of the UE;
calculating a ratio value of the PH value for the first cell to the total PH value for the activated cells of the UE; and
transmitting, to the first BS, the ratio value, the PH value for the first cell, and the information related to the PH for the second BS,
wherein the activated cells include both the first cell related to the first BS and a second cell related to the second BS,
wherein the information related to the PH for the second BS includes scheduling information for the second BS, and
wherein the scheduling information includes information on whether the UE received an uplink grant for the second BS,
wherein the ratio value and the PH value for the first cell are used by the first BS for calculating a PH value of the second cell.

2. The method according to claim 1, further wherein the scheduling information includes information on whether the UE transmits a PH value for the second cell to the second BS.

3. A user equipment (UE) in a wireless communication system comprising a first base station (BS) and a second BS, the UE comprising:
a transceiver; and
a processor, operatively coupled to the transceiver, wherein the processor is configured to:
obtain information related to a power headroom (PH) for the second BS,
obtain both a PH value for a first cell and a total PH value of activated cells of the UE,
calculate a ratio value of the PH value for the first cell to the total PH value for the activated cells of the UE,
control the transceiver to transmit to the first BS, the ratio value, the PH value for the first cell, and the information related to the PH for the second BS,
wherein the activated cells includes both the first cell related to the first BS and a second cell related to the second BS,
wherein the information related to the PH for the second base station includes scheduling information for the second BS, and
wherein the scheduling information includes information on whether the UE received a uplink grant for the second BS,
wherein the ratio value and the PH value for the first cell are used by the first BS for calculating a PH value of the second cell.

4. The UE according to claim 3, further wherein the scheduling information includes information on whether the UE transmits a PH value for the second cell to the second BS.

* * * * *